United States Patent

Zielinska et al.

[11] Patent Number: 5,808,209
[45] Date of Patent: Sep. 15, 1998

[54] VORTEX FLUID METER INCLUDING A PROFILED PIPE

[75] Inventors: Barbara Zielinska, Palaiseau; Souad Zikikout, Paris, both of France

[73] Assignee: Schlumberger Industries, S.A., Montrouge, France

[21] Appl. No.: 724,265

[22] Filed: Sep. 19, 1996

[30] Foreign Application Priority Data

Mar. 23, 1994 [FR] France ................................. 94 03407
Mar. 20, 1995 [WO] WIPO .................... PCT/FR95/00340

[51] Int. Cl.[6] ...................................................... G01F 1/32
[52] U.S. Cl. ......................................................... 73/861.22
[58] Field of Search .......................... 73/861.22, 861.24

[56] References Cited

U.S. PATENT DOCUMENTS 3,927,564  12/1975  Ketelsen ............................. 73/861.22
4,142,407   3/1979  Kuroiwa et al. ..................... 73/861.22
4,240,293  12/1980  Hughes ............................... 73/861.22
4,453,416   6/1984  Knudsen .............................. 73/861.22
5,398,548   3/1995  Ono .................................... 73/861.22
5,569,859  10/1996  Gatzmanga et al. ................. 73/861.22

*Primary Examiner*—George M. Dombroske
*Assistant Examiner*—Jewel Artis
*Attorney, Agent, or Firm*—Leonard W. Pojunas

[57] ABSTRACT

A vortex fluid meter (1) includes a pipe (2) having a maximum inside diameter D in which the fluid flows and having an internal profile comprising from the upstream end to the downstream end: a first pipe portion (4) progressively reducing the inside diameter of said pipe to a value D1 and having an inside wall (4a, 4b, 4c, 4d) at a continuously varying angle to the general direction of flow of the fluid; a second pipe portion (6) of constant diameter D1 in which is disposed at least one obstacle (8) adapted to generate oscillating fluid vortices; and a third pipe portion (20) returning the inside diameter of the pipe (2) to its original value D and adapted to separate the boundary layer of the fluid flow at a downstream end (6a) of said second pipe portion (6), and means (10, 12, 14, 16, 18, 200–221) for detecting the signal corresponding to the oscillations of the vortices and deducing the volume of fluid therefrom.

22 Claims, 6 Drawing Sheets

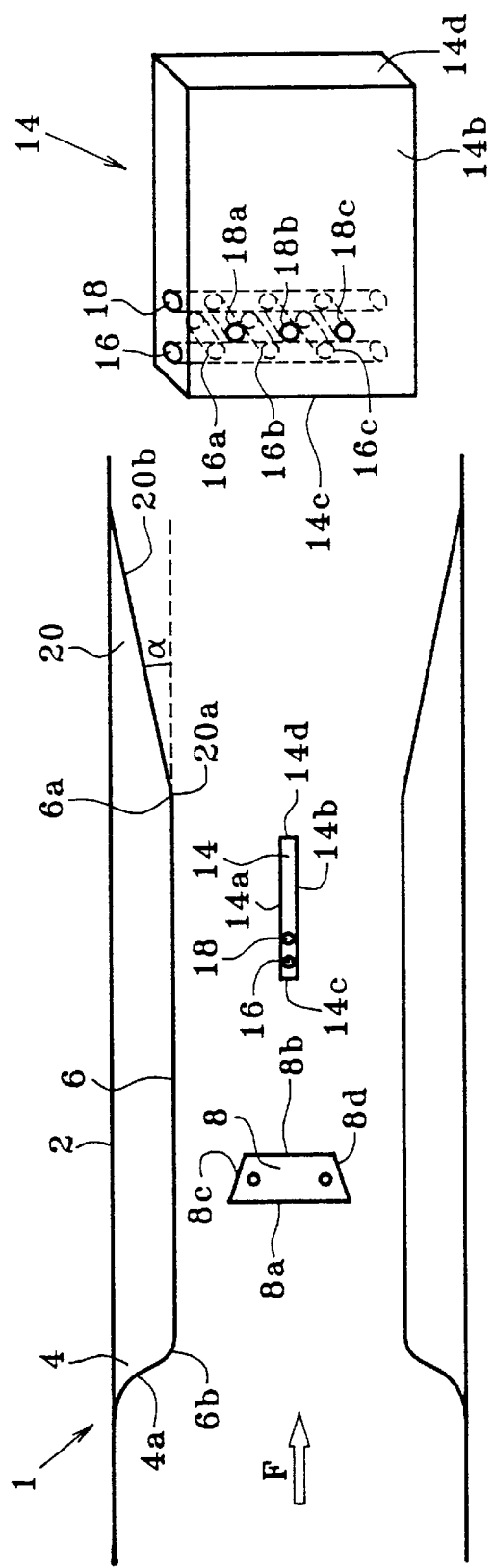
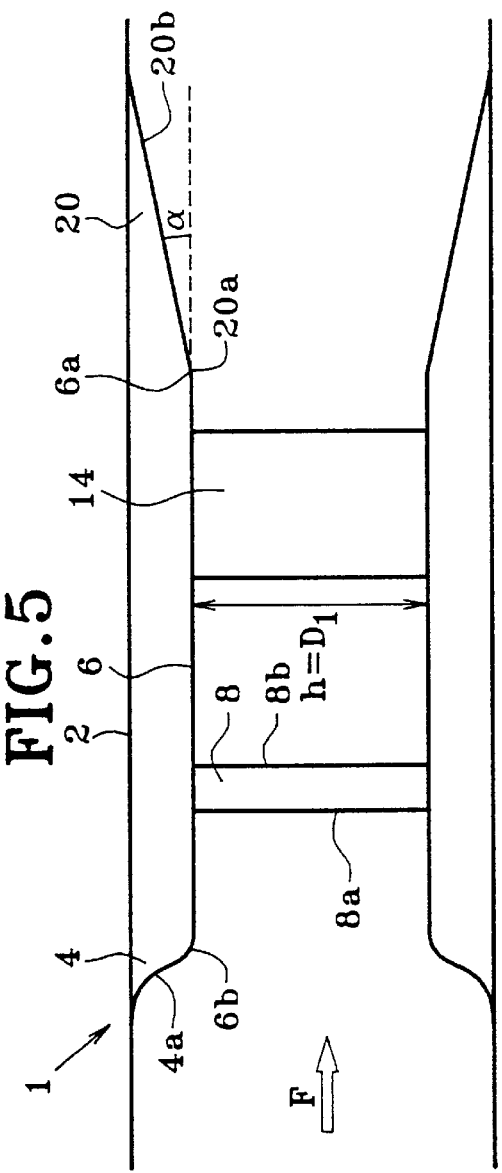
FIG. 5
FIG. 6
FIG. 7

VORTEX FLUID METER INCLUDING A PROFILED PIPE

FIELD OF THE INVENTION

The present invention concerns a vortex fluid meter including at least one obstacle adapted to generate oscillating fluid vortices and producing a substantially constant Strouhal number for low Reynolds numbers.

BACKGROUND OF THE INVENTION

Vortex fluid meters or flowmeters are widely known and usually comprise a pipe along which there flows a fluid whose volume and/or flowrate are to be measured. An obstacle is placed in the fluid flow inside the pipe so that when the fluid flow meets said obstacle fluid vortices are generated and separate from the obstacle in an oscillatory manner. This kind of meter also includes means for determining the volume of fluid from these oscillations. These means are usually on the obstacle. The principle of measuring the fluid volume in this type of meter is based on the fact that the frequency of oscillation of the vortices is approximately proportional to the speed of the fluid in the pipe and the aforementioned means detect a signal corresponding to the oscillations of said vortices. This signal can be a differential pressure, for example.

The purpose of a vortex fluid meter is to provide an accurate and reliable measurement of the flowrate or the volume of the fluid flowing through the pipe for wide ranges of Reynolds numbers. To this end the Strouhal number (the ratio of the product of the oscillation frequency multiplied by the obstacle diameter to the speed of the fluid) must be constant for varying Reynolds numbers (the ratio of the product of the fluid speed multiplied by the pipe diameter to the dynamic viscosity of the fluid). Recent research in this field has lead to the design of vortex fluid meters with optimized obstacle shapes and dimensions and that are totally satisfactory for high Reynolds numbers, for example Reynolds numbers in the order of 260,000, where the flow is highly turbulent. On the other hand, at low Reynolds numbers, for example Reynolds numbers in the order of 30,000, the flow is increasingly laminar which changes the nature of the vortices. As a result the calibration curve for such fluid meters is not linear for low Reynolds numbers. Patent GB-A-2 142 725 describes a vortex fluid meter including a Venturi pipe and an obstacle at the throat of said pipe adapted to generate oscillating vortices, and means for detecting the presence of said vortices downstream of said obstacle.

That fluid meter increases the Reynolds number by 30% at the throat of the Venturi pipe, but the divergent section of a Venturi pipe diverges at a relatively low angle, less than 8 degrees, so that the boundary layer of fluid flow does not separate from the walls of the divergent section to cause recirculation of the fluid which could increase its head loss.

Given the pipe diameters mentioned in the above patent, it is clear that an increase in head losses is not wanted.

Because of the configuration of the pipe, the pressure of the fluid in the divergent part of said pipe varies progressively, and the vortices which separate from the obstacle vary in shape, which varies the Strouhal number.

A fluid meter as described in patent GB-A-2 142 725 is very long which is a drawback if the meter is intended for a specific environment for which a main requirement is that the meter should be compact.

SUMMARY OF THE INVENTION

The present invention is directed to alleviating those drawbacks by proposing a compact vortex fluid meter for which the Strouhal number is substantially constant for low Reynolds numbers of the fluid flow and is also substantially constant for high Reynolds numbers, thereby improving the performance of said meter over a wide range of Reynolds numbers.

The present invention comprises a pipe having a maximum inside diameter D in which the fluid flows, at least one obstacle disposed in the middle of the fluid flow and adapted to generate oscillatory vortices in the fluid, said obstacle having an elongate general shape of longitudinal dimension D1 and of transverse dimension d perpendicular to the fluid flow direction, means for detecting the signal corresponding to the oscillations of said vortices and deducing the volume of fluid therefrom, the meter being characterized in that said pipe has an internal profile comprising from the upstream end to the downstream end: a first pipe portion progressively reducing the inside diameter of said pipe to a value D1 and having an inside wall at a continuously varying angle to the general direction of flow of the fluid, said angle having a null value at locations in the pipe at which the diameter of said first portion is respectively equal to D and D1; a second pipe portion of constant diameter D1 in which the obstacle is located; and a third pipe portion returning the inside diameter of the pipe to its original value D and adapted to detach the boundary layer of the fluid flow at a downstream end of said second pipe portion.

The Applicant has discovered, quite unexpectedly, that by suddenly separating the boundary layer of the fluid flow at a downstream end of the second pipe portion a pressure rise is produced at this end, the effect of which local pressure rise is to confine the vortices which separate from the obstacle in the second pipe portion, thereby constraining them to remain of constant size. For the pressure rise to occur it is especially important for the boundary layer to separate exactly at the downstream end of the second pipe portion. It follows that for low Reynolds numbers of the fluid flow, the vortex oscillation frequency is directly proportional to the speed of the fluid and the Strouhal number is therefore substantially constant. The linearity of the fluid meter is therefore significantly improved at low Reynolds numbers.

According to a characteristic of the invention the third pipe portion has a sharp edge at an upstream end coincident with the downstream end of the second pipe portion and, downstream of said sharp edge, an inside wall at a constant angle _ in the range 9 degrees to 20 degrees to the direction of the flow of the fluid. The angle _ is preferably in the range 10 degrees to 15 degrees.

According to another characteristic of the invention the third pipe portion has at its upstream end coincident with the downstream end of the second portion a flange having an outside diameter D1, an inside diameter D2 less than D1 and an inside edge forming a sharp edge. According to another characteristic of the invention the flange has a longitudinal dimension (D1−D2)/2 in the range 2% to 5% of the diameter D1 of the second pipe portion. According to another characteristic of the invention, in a plane containing the axis of symmetry of the pipe, the flange has a local cross-section which is uniform and triangular, the apex of the triangle constituting the local inside edge of said flange.

The first pipe portion should ideally have no sharp edges to prevent the boundary layer of fluid flow separating at the entry to the constriction, thereby creating disturbances in said flow and therefore in the oscillation of the fluid vortices. Various shapes for the internal profile of the first pipe portion have been tried and have given good results. For example, the inside wall of the first pipe portion can have a local inside profile formed, in a plane containing the axis of symmetry of the pipe, in the upstream to downstream direction, by two successive circular arcs with their concave sides facing opposite ways, corresponding to circles of radius r and R satisfying the equation $$r = (a^2 + b^2)/2b(\mu+1)$$

where:

$$a = \sqrt{b[2(R+r) - b]}$$

$$b = (D - D1)/2$$

$$\mu = R/r$$

The inside wall of the first pipe portion can have a local interior profile which is formed in a plane containing the axis of symmetry of the pipe by a portion of a sinusoidal curve.

According to other characteristics of the invention:

the diameter D1 of the second pipe portion lies in the range 60% to 90% of the original diameter D, the diameter D1 lies preferably in the range 70% to 80% of the original diameter D, the obstacle is at a distance from the first pipe portion in the range 0.5 D1 to D1, the second pipe portion has a length in the range 1.5 times to 3 times the diameter D1, the ratio d/D1 lies in the range 0.15 to 0.30;

the means for detecting the signal corresponding to the oscillations of the vortices and for deducing the volume of fluid therefrom are attached to the obstacle. The obstacle has an upstream face and a downstream face parallel to each other and perpendicular to the direction of fluid flow, and two symmetrical lateral faces whereby the cross-section of said obstacle is trapezium-shaped, the base of said trapezium being on the upstream side;

the means for detecting the signal corresponding to the oscillations of the vortices and for deducing the volume of fluid therefrom comprise two parallel main longitudinal passages symmetrically disposed in the obstacle near lateral faces of the latter together with a plurality of evenly distributed secondary passages connecting said main passages in a direction perpendicular to said lateral faces, and a sensor connected to the main passages and to an electronic circuit for deducing the volume of fluid from the said detected signal;

the means for detecting the signal corresponding to the oscillations of the vortices and for deducing the volume of fluid therefrom comprise a plate disposed in the middle of the fluid flow downstream of the obstacle and in the second pipe portion, said plate having a longitudinal dimension h perpendicular to the direction of flow of the fluid and a rectangular cross-section formed by two larger lateral faces parallel to the direction of flow of the fluid and smaller upstream and downstream faces, two parallel longitudinal main passages in said plate near said upstream face, each of said main passages being connected to one only of said lateral faces by a plurality of evenly distributed perpendicular secondary passages, and a sensor connected to the main passages and to an electronic circuit for deducing the volume of fluid from the said detected signal;

the upstream face of the plate has a transverse dimension in the range 0.1 times to 0.4 times the transverse dimension d of the obstacle, the upstream face of the plate is at a distance from the upstream face of the obstacle in the range 3d to 7d, the main passages have a diameter slightly less than the transverse dimension of the upstream face of the plate and said main passages are offset relative to each other in the direction of flow of the fluid.

BRIEF DESCRIPTION OF THE FIGURES

Other characteristics and advantages will emerge during the following description given by way of non-limiting example only and with reference to the appended drawings in which:

FIG. 5 is a diagrammatic view of a different embodiment of vortex gas meter of the invention in section on a plane containing the axis of symmetry of the pipe, FIG. 6 is a diagrammatic view of the meter shown in FIG. 5 in section on a plane perpendicular to the plane of FIG. 5, FIG. 7 is a diagrammatic perspective view of the plate 14 of the vortex gas meter shown in FIGS. 5 and 6.

DETAILED DESCRIPTION

As shown in FIGS. 1, 2, 5 and 6 the vortex fluid meter 1 of the invention is a gas meter suitable for measuring a volume of gas for low Reynolds numbers, i.e. for Reynolds numbers below about 33,000 and even as low as 16,500. This type of meter includes a pipe 2 inside which flows the gas whose volume is to be measured. As shown in FIGS. 1, 2, 5 and 6 the pipe 2 has a maximum inside diameter D and has an inside profile comprising in the upstream to downstream direction three successive pipe portions having respective different technical characteristics.

The first portion 4 progressively reduces the maximum inside diameter D of the pipe 2 to a value D1 by means of a profiled wall 4a.

This profiled wall is at an angle to the general direction of flow of the gas which varies continuously from the intersection of said wall with the pipe 2 of maximum diameter D, at which intersection said angle is zero, up to the intersection of the wall with a second pipe portion of diameter D1 at which the angle is again zero.

Figure 3A:
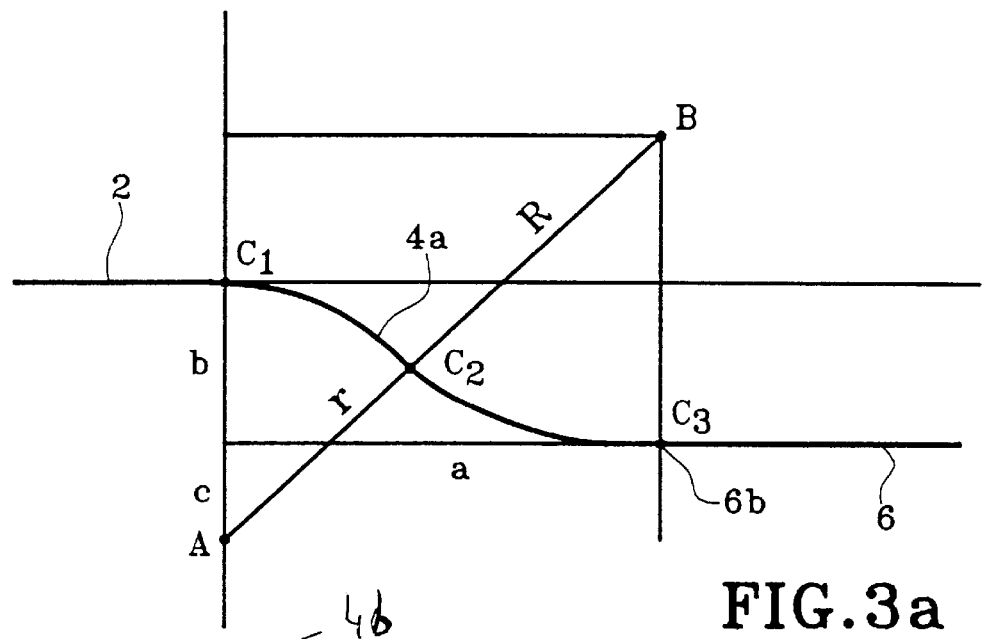
FIG. 3d shows another embodiment of the first pipe portion wall shown in FIGS. 3a to 3c.

This is highly advantageous because the gas flow does not encounter any sharp edges as it enters the meter and so is not disrupted by the formation of turbulence. The flow therefore accelerates in the second pipe portion of diameter D1 which produces flow conditions closer to turbulence for low gas speeds. The first pipe portion 4 can have the profiled wall 4a shown in FIG. 3a, for example.

This figure shows part of the first pipe portion 4 in a plane containing the axis of symmetry of the pipe and therefore parallel to the direction of flow of the gas. It shows that the local internal profile is formed in the upstream to downstream direction by two successive circular arcs with the concave sides facing in opposite directions and merging at a point. A first circular arc corresponds to a first circle of center A and radius r and is tangential to the pipe of diameter D at a contact point C1. A second circular arc is joined to the first circular arc at a point C2 and is tangential to the second pipe portion 6 of diameter D1 at a point C3. The second circular arc corresponds to a second circle of center B and radius R.

The condition for the two circular arcs to meet at the point C2 is $$(r+R)^2 = a^2 + (R+c)^2 \quad (1)$$

and since c=r−b:

$$a = \sqrt{b[2(R+r) - b]} \quad (2)$$

so by squaring equation (2):

$$r = (a^2 + b^2)/2b(\mu+1) \quad (3)$$

where:

$$b = (D-D1)/2$$

$$\mu = R/r$$

Depending on the radii r and R of the circles, for fixed diameters D and D1 the wall of the first pipe portion 4 can be given the required profile.

Figure 3B:
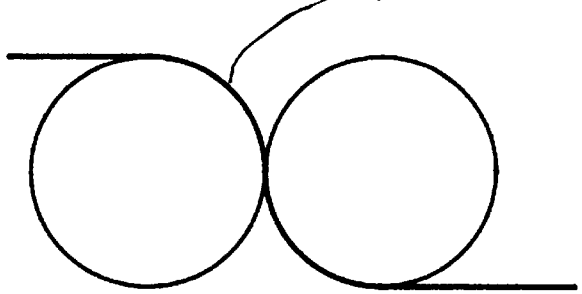
Figure 3C:
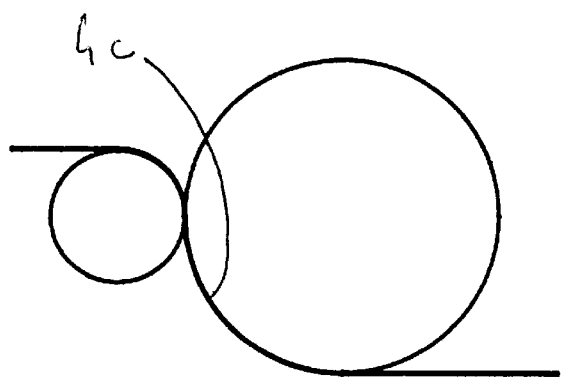
Figure 3D:
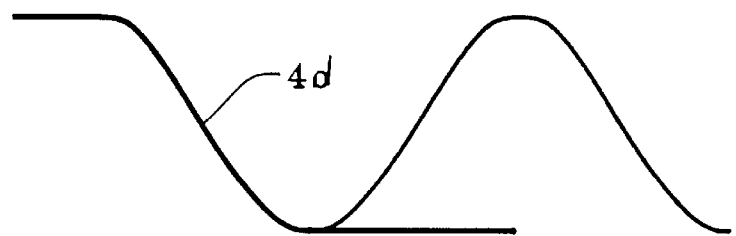

By making D1 equal to 72% of D for r=R the profiled wall 4b shown in FIG. 3b is obtained while for R=1.75r the profiled wall 4c is of the form shown in FIG. 3c. In the embodiment of the invention shown in FIG. 3d the wall 4d of the first pipe portion 4 has in a plane containing the axis of symmetry of the pipe a local internal profile in the form of part of a sinusoidal curve.

Downstream of the first pipe portion the internal profile of the pipe 2 is defined by the second portion 6 previously referred to which has a constant diameter D1 throughout its length. The smaller diameter D1 of the second pipe portion 6 is in the range 60% to 90% of the original maximum diameter of said pipe. If D1 is less than 60% of D, the head loss is prohibitive and the oscillation frequency is too high to be measured. If D1 is greater than 90% of D, the gas flow is not accelerated sufficiently.

The diameter D1 lies preferably in the range 70% to 80% of the original diameter D. For example, the diameter D1 is 72% of the original diameter D.

The vortex gas meter 1 of the invention includes an obstacle 8 in the second pipe portion 6 of diameter D1. The obstacle 8 is placed in the middle of the gas flow so that when said flow encounters said obstacle gas vortices are generated and separate from the obstacle in an oscillating manner. The obstacle 8 is shown in FIGS. 1, 2, 4, 5 and 6 and has an elongate shape with a longitudinal dimension $D_1$ equal to its height and perpendicular to the direction of flow of the gas in the pipe 2. The obstacle 8 has a transverse dimension d equal to its width and has a cross-section which is substantially uniform in all planes parallel to the plane of FIG. 2 and can assume various shapes. The ratio d/D1 is advantageously in the range 0.15 to 0.3. For example, it is equal to 0.23. If d/D1 is greater than 0.3 the oscillatory effect tends to be diminished. Conversely, if d/D1 is less than 0.15 the separation of the vortices is no longer coherent along all of the longitudinal dimension of the obstacle.

As shown in the figures previously mentioned, the obstacle 8 has an upstream face 8a and a downstream face 8b which are both plane and parallel to each other, said upstream face 8a being larger than said downstream face 8b. The planes of both these faces are perpendicular to the direction of flow of the gas. The obstacle 8 also has two symmetrical lateral faces 8c and 8d at a constant angle to the upstream face 8a so that the transverse section of said obstacle is trapezoidal in shape with the base facing upstream.

In the second pipe portion 6 the obstacle 8 is located near the first pipe portion 4 to leave sufficient room on its downstream side for the vortices to form, to be more precise, the upstream face 8a of the obstacle 8 is at a distance from the first pipe portion 4 in the range 0.5 D1 to D1. If this distance is less that 0.5 D1 the profile of the gas flow reaching the obstacle has not yet stabilized. Likewise, if this distance is greater than D1 the speed profile of the gas flow develops a boundary layer which can induce strong secondary vortices which disrupt the oscillatory main vortices and the gas meter is no longer so compact. For example, the upstream face 8a of the obstacle 8 is at a distance from the first pipe portion 4 equal to 0.6 D1. Several obstacles of identical or different shape placed one after the other in the direction of flow of the gas could be used instead of a single obstacle.

The length of the second pipe portion 6 is in the range 1.5 times to 3 times the diameter D1 to make the gas meter very compact while leaving sufficient room for the vortices to form. This length is twice the diameter D1, for example.

Figure 4:
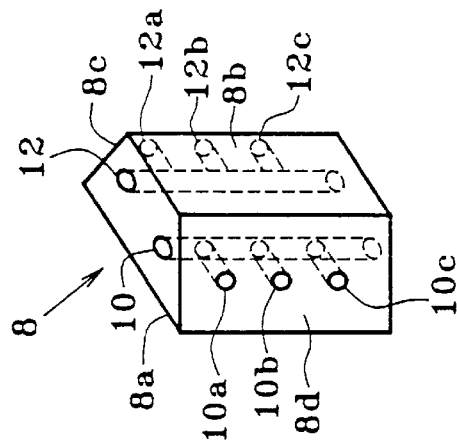
FIG. 4 is a diagrammatic perspective view of the obstacle of the vortex gas meter shown in FIGS. 1 and 2.
Figure 2:
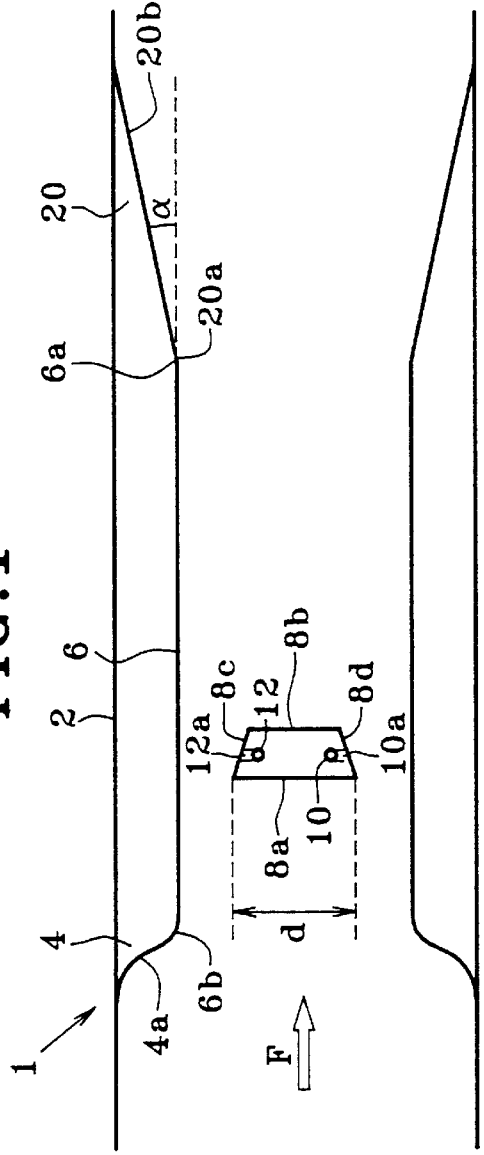
FIG. 2 is a diagrammatic view of the meter shown in FIG. 1 in section on a plane containing the axis of symmetry of the pipe and perpendicular to that of FIG. 1, FIGS. 3a to 3c are partial diagrammatic views of various embodiments of the wall of the first pipe portion of the meter of the invention in section on a plane containing the axis of symmetry of the pipe.

In accordance with the invention the vortex gas meter 1 includes means for detecting the signal corresponding to the oscillations of the vortices generated by the obstacle 8 and for deducing the volume of the gas therefrom. The person skilled in the art knows how to deduce the flowrate of the gas directly from the detection of this signal. These means can be attached to the obstacle 8 as shown in FIGS. 2 to 4.

These figures show that the means for detecting the signal corresponding to the oscillations of the vortices and for deducing the volume of gas therefrom comprise two parallel main passages 10 and 12 running longitudinally of the obstacle 8 near its side walls 8c and 8d. These passages 10 and 12 are symmetrical to a median plane containing the axis of symmetry of the pipe 2 and perpendicular to the plane containing the transverse section of the obstacle 8. The aforementioned means also include a plurality of secondary passages, for example three per main passage: 10a, 10b, 10c and 12a, 12b, 12c; these passages are evenly distributed along the longitudinal dimension of the main passages 10 and 12 perpendicularly to said main passages. They connect the main passages to the faces 8c and 8d of the obstacle 8.

The diameter of the secondary passages 10a, 10b, 12a, 12b is substantially equal to that of the main passages. Each main passage 10 and 12 is connected to a heat sensor (not shown), for example, which detects the differential pressure between said main passages due to the separation of the vortices.

A pressure sensor can be used instead.

Figure 11:
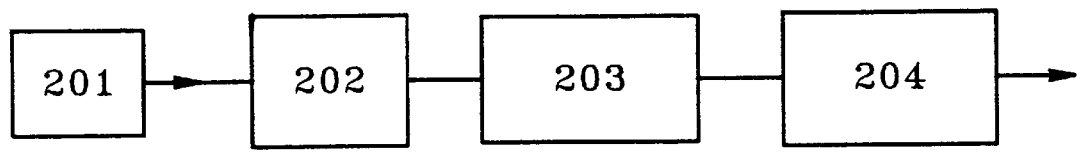
FIG. 11 is a simplified circuit schematic of an electronic circuit for determining the volume of gas from the detection of the differential pressure.

FIG. 11 is a simplified block diagram of an electronic circuit which, from the detection of differential pressure by the sensor 201, successively delivers to the amplifier means 202 an alternating current signal at the input of a peak detector 203, by means of said peak detector, converts this alternating current signal to an impulse signal in which each pulse represents a unit volume of gas and, using a counter 204, counts the number of pulses to obtain a volume of gas.

Figure 12:
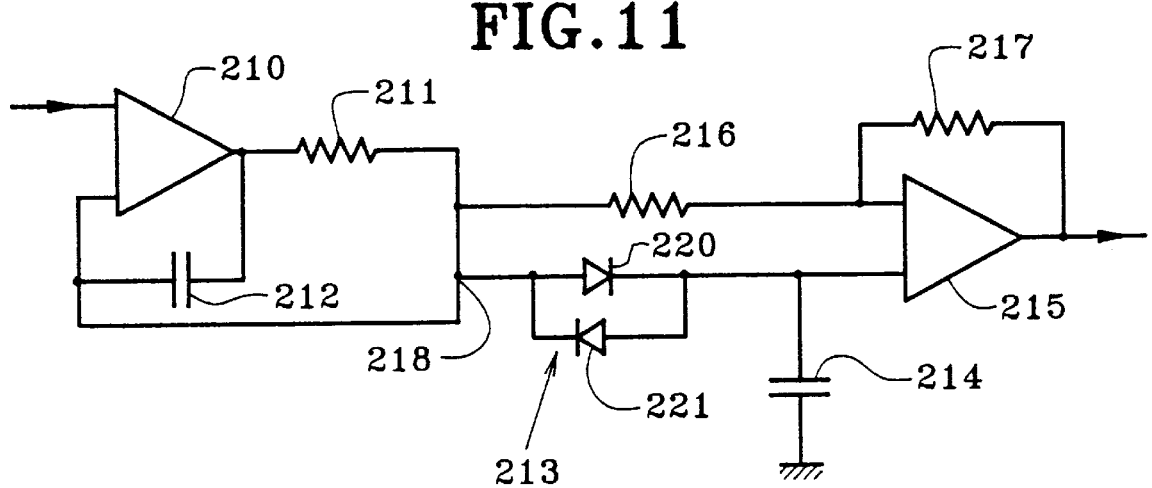
FIG. 12 shows a peak detector used in the FIG. 11 circuit.

As shown in FIG. 12, a peak detector 203 includes, for example, an amplifier 210 with a resistor 211 and a capacitor 212, a threshold device 213 including two diodes 220, 221 connected in reverse parallel, a capacitor 214 providing a memory function, a differential amplifier 215 and resistors 216, 217. Each diode 220, 221 can be the junction of a field-effect transistor.

The amplifier 210, the resistor 211 and the capacitor 212 isolate the signal at the input of the capacitor 214. Each diode has its own threshold and exhibits a voltage drop when conducting (on). If the amplitude of the signal at the point 218 rises above the threshold of the diode 220 the diode is turned on and the value of the voltage at the point 218 less the voltage drop of the diode 220 is stored in the capacitor 214. The differential amplifier 215 compares the voltage at the point 218 with the voltage across the capacitor 214 and outputs a high signal if the voltage at the point 218 is greater than the voltage across the capacitor 214.

When a peak is reached and the signal amplitude falls the difference between the value of the signal at the point 218 and the value of the signal stored by the capacitor 214 falls below the threshold of the diode 220 and the diode 220 is turned off. This fixes the value of the signal stored in the capacitor 214. When the amplitude of the signal at the point 218 falls below the value of the signal stored by the capacitor 214 the amplifier 215 supplies a low signal showing that a peak has occurred. When the value of the signal falls below the value of the signal stored in the capacitor 214 by an amount corresponding to the threshold of the diode 221 the latter is turned on and the value of the signal stored in the capacitor 214 drops with the value of the signal at the point 218 reduced by the voltage drop of the diode 221. When a negative peak is reached and passed the diode 221 is turned off again and the amplifier 215 will indicate a change of state when the signal at the point 218 rises above the value of the signal stored in the capacitor 214.

Figure 13:
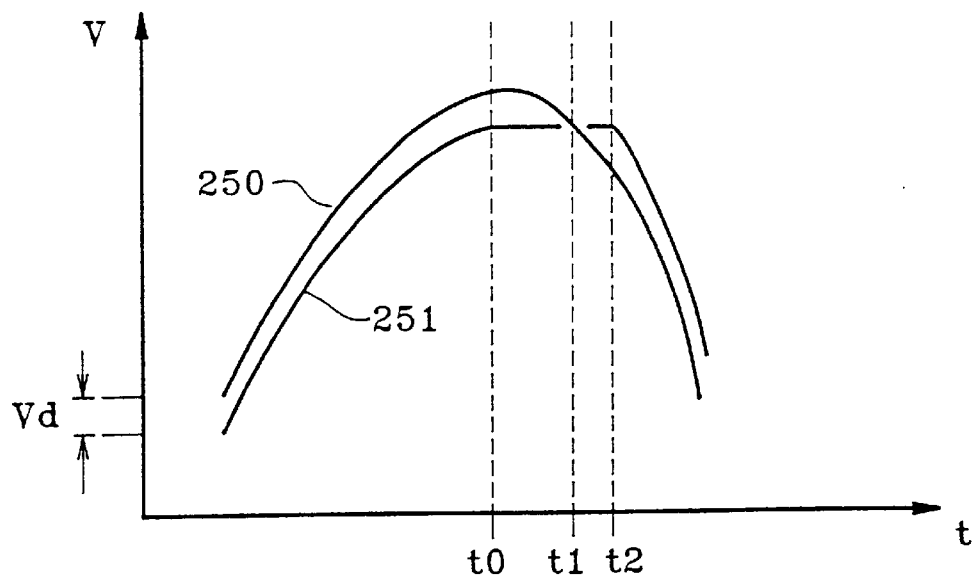
FIG. 13 shows the peak detection operation carried out on a peak by the peak detector from FIG. 12.

FIG. 13 shows the variation in the voltage of the first signal at the point 218 (curve 250) and the variation in the capacitor voltage (curve 251). The capacitor voltage 251 is initially equal to the voltage of the signal 250 less the value Vd corresponding to the voltage drop of the diode 220 and the amplifier 215 supplies a high signal. When a peak is reached at time t0 and the voltage of the signal 250 falls below the threshold value of the diode 220 the capacitor voltage 251 is fixed. At time t1 the voltage of the signal 250 falls below the voltage 251 stored in the capacitor and the output of the amplifier 215 supplies a low signal. At time t2 the difference between the voltage of the signal and the voltage stored in the capacitor is greater than the value of the threshold of the diode 221 and the capacitor voltage tracks the voltage of the first signal.

Figure 14:
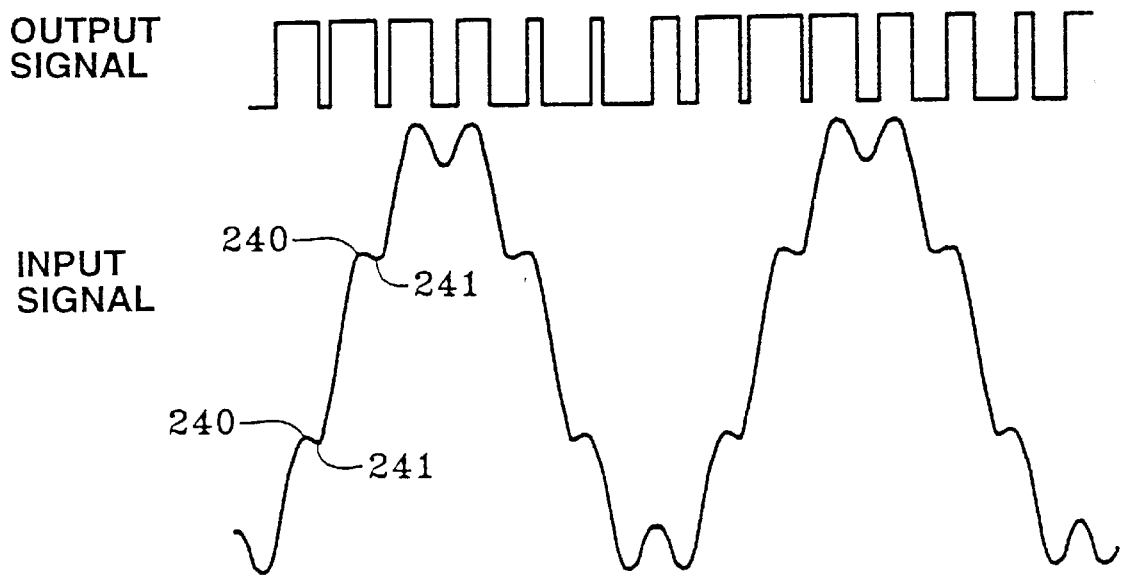
FIG. 14 shows a representative example of the respective signals at the input and output of the FIG. 12 peak detector.

FIG. 14 shows the output signal of the FIG. 12 circuit compared with a typical input signal. The input signal can be regarded as a sinusoidal signal with a high frequency but a low amplitude superimposed on high amplitude noise causing large variations in the signal amplitude. Despite these variations, the change in the direction of the input signal at each positive peak 240 or each negative peak 241 is marked by a change in the direction of the output signal. The output signal can be used directly by the counter 204 to deliver the number of pulses and therefore the volume of gas. Knowing the time between two pulses, it is also a very simple matter to obtain the value of the gas flowrate.

In an embodiment of the invention shown in FIGS. 5 through 7 the mans for detecting the signal corresponding to the oscillations of the vortices and for deducing therefrom the volume of the gas are downstream of the obstacle 8 and include a plate member 14 in the second pipe portion 6 in the middle of the flow of the gas. The plate 14 has a longitudinal dimension D1 corresponding to its height h and perpendicular to the direction of flow of the gas. The plate 14 has two parallel larger faces 14a and 14b parallel to the direction of flow of the gas and called its lateral faces and two parallel smaller faces 14c and 14d perpendicular to said larger faces and respectively called its upstream face 14c and downstream face 14d. The upstream face 14c of the plate 14 is at a distance from the upstream face 8a of the obstacle 8 in the range 3d to 7d. The plate 14 is at a distance from the upstream face 8a equal to 4d, for example. As shown in FIGS. 5 and 7, the transverse section of the plate 14 is rectangular. The shape of the plate 14 is advantageous because it constitutes an obstacle with sharp edges which cause separation of the flow of the gas in contact with the upstream face 14c, also called the leading edge, creating an area of turbulence which favors impact of the vortices on the lateral faces 14a and 14b alternately, which improves the signal produced. Two parallel main passages 16 and 18 extend longitudinally through the plate 14 near its upstream face 14c. These passages 16 and 18 extend into the plate 14 from its upper part a distance less than the height h of said plate. A plurality of secondary passages 16a, 16b, 16c and 18a, 18b, 18c are evenly distributed along the longitudinal dimension of the main passages 16 and 18 to connect each of the main passages perpendicularly to only one lateral face 14a or 14b of the plate 14.

For example, each main passage 16 (18) is connected to one lateral face 14a (14b) of the plate 14 by three secondary passages 16a, 16b, 16c (18a, 18b, 18c) whose diameter is substantially equal to that of the main passages. The two main passages 16 and 18 are connected to a heat sensor (not shown), for example, which detects the flow due to the differential pressure induced in said passages by the separation of the vortices. The transverse dimension (width) of the upstream face 14c is in the range 0.1 d to 0.4 d. It is equal to 0.25 d, for example.

The diameter of the main passages 16 and 18 is slightly less than the width of the plate 14 and said passages are offset relative to each other in the direction of flow of the gas and are as close as possible to the leading edge of said plate 14 to recover the optimum information from the signal. This embodiment is advantageous in that the signal obtained from the plate in this way will have a greater amplitude than that obtained from the obstacle. The passages also filter all noise accompanying the signal due to the viscous forces encountered by the gas in said passages so that the signal to noise ratio is improved.

In a different embodiment of the invention, not shown in the figures, the means for detecting the signal corresponding to the oscillations of the vortices and for deducing therefrom the volume of gas include two ultrasonic transducers downstream of the obstacle 8 in the second pipe portion 6 and attached to the walls of the latter at diametrically opposed points (there is no need in this embodiment for a plate as described above). One transducer outputs an ultrasonic signal modulated by the oscillations of the vortices which is picked up by the other transducer and demodulated to deduce from it the oscillation frequency and therefore the flowrate and the volume of gas.

In accordance with the invention, the vortex gas meter 1 also includes a third pipe portion 20 at the downstream end 6a of the second pipe portion 6 of constant diameter D1. The third pipe portion 20 returns the inside diameter of the pipe 2 to its original value D. It is adapted to cause separation of the boundary layer of the flow of gas at the downstream end 6a of the second pipe portion 6. Unlike the rounded intersection of the first and second pipe portions 4 and 6, there is a sharp edge 20a at the upstream end of the third portion 20, which coincides with the downstream end 6a of the second pipe portion (see FIGS. 1, 2, 5 and 6).

The third pipe portion 20 has a frustoconical wall 20b extending from the sharp edge 20a to the pipe of maximum diameter D at a constant angle a to the direction of flow of the gas. The angle a is usually in the range 9 degrees to 20 degrees.

The angle a is preferably in the range 10 degrees to 15 degrees. It is equal to 10.78 degrees, for example.

Because of the sudden expansion in the pipe at a given angle after the straight pipe portion 6 in which the oscillating vortices are formed, the speed of the gas is reduced and its pressure is increased. The Applicant has found that this characteristic of the invention causes separation of the flow of gas at and downstream of the sharp edge 20a and so gives rise to a pressure barrier at the exit from the second pipe portion 6. The function of this pressure barrier is to confine the gas vortices inside the second pipe portion 6 so that the size of the vortices remains the same and the Strouhal number is constant, especially for low values of the Reynolds number of the flow of the gas, with the result that the oscillation frequency is directly proportional to the speed of the gas. The expansion angle of the third pipe portion 20 must be carefully chosen to obtain an acceptable pressure. An expansion angle greater than 20 degrees causes intense recirculation of the gas and the resulting variation in the speed of the gas increases its turbulence and does not produce an effective pressure barrier to maintain the size of the vortices constant.

For an expansion angle less then 9 degrees the pressure would rise gradually along the third pipe portion 20 and would not be sufficient to control the size of the vortices. Differing in this regard from the present invention, in the divergent section of Venturi pipes the expansion angle varies continuously and its local value is less than 8 degrees allowing a gradual variation in pressure and preventing separation of the gas boundary layer, which causes high head losses.

Figures 8, 9:
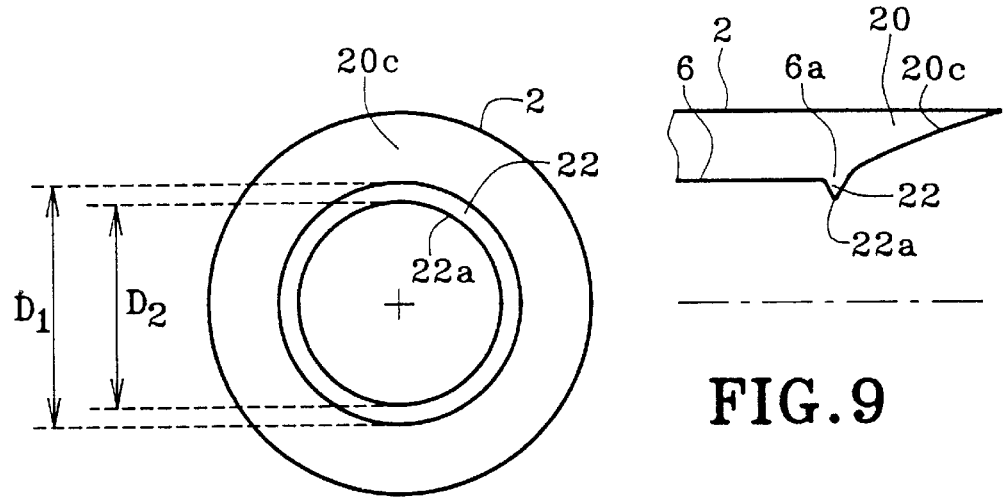
FIG. 8 is a view of a different embodiment of the third pipe portion of the vortex gas meter of the invention in section on a plane perpendicular to the axis of symmetry of the pipe.
FIG. 9 is a diagrammatic partial view of the third pipe portion shown in FIG. 8 in section on a plane containing the axis of symmetry of the pipe.

In an embodiment of the invention shown in FIGS. 8 and 9 the third pipe portion 20 has a flange 22 at its upstream end which is coincident with the downstream end 6a of the second pipe portion.

The flange 22 is fixed at the intersection of the second pipe portion 6 and the third pipe portion 20 and has an inside edge 22a at an inside diameter D2 less than D1 and forming a sharp edge, the outside diameter of said flange being equal to D1.

In a plane perpendicular to the direction of flow of the gas as shown in FIG. 8 the flange 22 is annular. For the sharp edge 22a of the flange 22 to be able to cause separation of the boundary layer to generate a local pressure rise which will keep the gas vortices inside the second pipe portion 6, the longitudinal dimension (D1–D2)/2 of said flange 22, or its height, must be in the range 2% to 5% of the diameter D1 of said second portion 6. If this diameter is less than 2% of the diameter D1 the area in which the boundary layer separates is too small to generate an effective pressure rise at the downstream end 6a of the second pipe portion 6. On the other hand, if this dimension is more than 5% of the diameter D1 the separation area is very large and this gives rise to an area of unsteady pressure increase which disrupts the repeatability of the signal. In a plane containing the axis of symmetry of the pipe the flange 22 has a local cross-section which is triangular, for example, whose apex constitutes the inside edge 22a of said flange in this plane. As shown in FIG. 9, the shape of the upper local cross-section of the flange 22 is a triangle with the apex at the bottom. The shape of the lower local cross-section of the flange 22 (not shown in FIG. 9) is symmetrical about the axis of symmetry of the pipe. For this embodiment of the invention the inside wall 20c of the third pipe portion 20 is not necessarily at a constant angle to the direction of flow of the gas.

Figure 10:
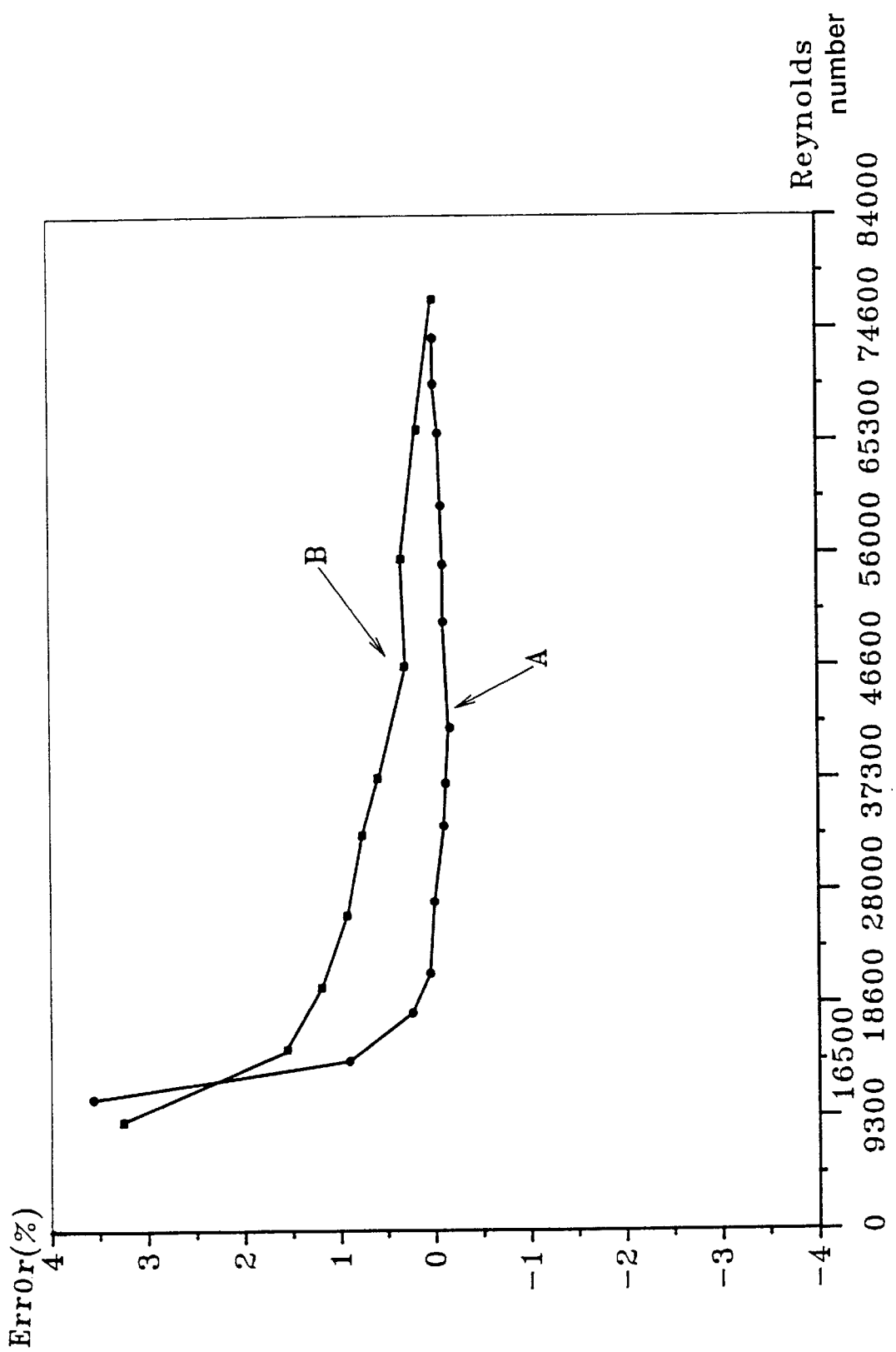
FIG. 10 is a graph showing the calibration curves of a vortex gas meter of the invention (A) and a vortex gas meter of the prior art (B), respectively.

The vortex fluid meter of the invention also has the advantage of being compact, given that it is shorter than prior art meters. To demonstrate that the vortex fluid meter of the present invention is better than a prior art meter the Applicant carried out tests whose results are shown in FIG. 10. These tests were carried out on two vortex gas meters in succession, the first, prior art meter having a straight gas flow pipe of diameter D=100 mm and an obstacle with a trapezium-shape transverse section adapted to generate vortices and having means for detecting the signal corresponding to oscillation of the vortices and deducing therefrom the volume of the gas. The obstacle and the means previously mentioned were similar to those described in the above discussion of FIGS. 1, 2 and 4.

Figure 1:
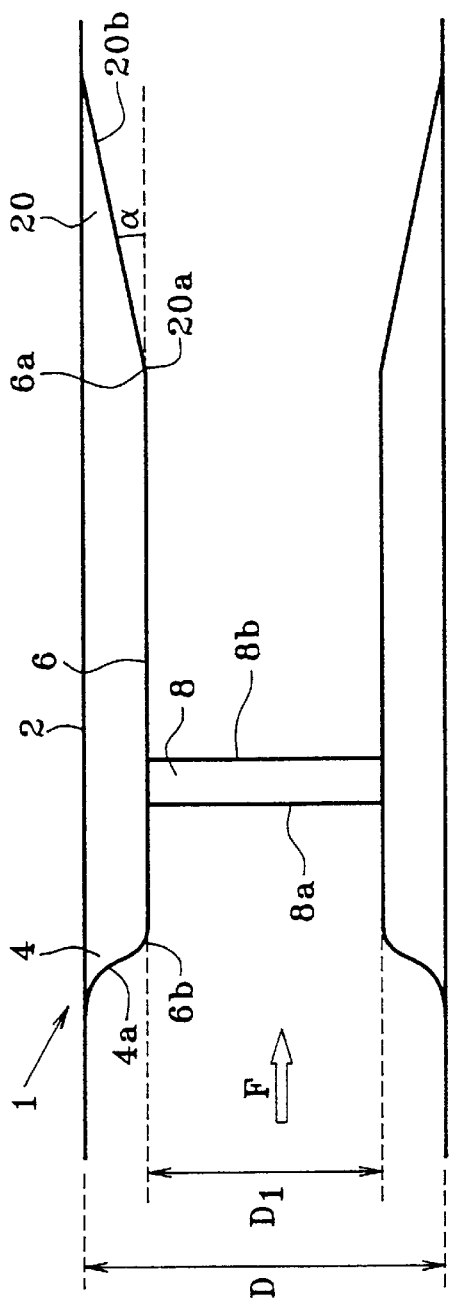
FIG. 1 is a diagrammatic view of a vortex gas meter of the invention in section on a plane containing the axis of symmetry of the pipe.

The second gas meter, that of the invention, is shown in FIGS. 1, 2 and 4. The tests consisted in recording the relative error in determining the volume of gas flowing through each of the meters relative to a calibration meter for flowrates in the range from 50 m³/h to 450 m³/h, corresponding to a range of Reynolds numbers from 9,300 to 84,000.

FIG. 10 shows for each meter the relative percentage error as a function of the Reynolds number and the curves A and B obtained are respectively the calibration curves for the meter of the invention and for the prior art meter. These curves thus provide a clear demonstration that the gas meter of the invention has very significantly improved linearity at low Reynolds numbers.

Gas meters of the present invention show good linearity for Reynolds numbers below 33,000 and down to 16,500.

We claim:

1. A vortex fluid meter comprising:

a pipe having a maximum inside diameter D in which the fluid flows, at least one obstacle disposed in the middle of the fluid flow and adapted to generate oscillatory vortices in the fluid, said obstacle having an elongate general shape of longitudinal dimension D1 and of transverse dimension d perpendicular to the fluid flow direction, means for detecting the signal corresponding to the oscillations of the vortices and deducing the volume of fluid therefrom, the meter being characterized in that said pipe has an internal profile comprising from the upstream end to the downstream end: a first pipe portion progressively reducing the inside diameter of said pipe to a value D1 and having an inside wall at a continuously varying angle to the general direction of flow of the fluid, said angle having a null value at locations in the pipe at which the diameter of said first portion is respectively equal to D and D1; a second pipe portion of constant diameter D1 in which the obstacle is located; and a third pipe portion returning the inside diameter of the pipe to its original value D and adapted to detach the boundary layer of the fluid flow at a downstream end of said second pipe portion.

2. A vortex fluid meter according to claim 1 characterized in that the third pipe portion has a sharp edge at an upstream end coincident with the downstream end of the second pipe portion and, downstream of said sharp edge, an inside wall at a constant angle a in the range 9 degrees to 20 degrees to the direction of the flow of the fluid.

3. A vortex fluid meter according to claim 2 characterized in that the angle a is preferably in the range 10 degrees to 15 degrees.

4. A vortex fluid meter according to claim 1 characterized in that the third pipe portion has at its upstream end coincident with the downstream end of the second portion a flange having an outside diameter D1, an inside diameter D2 less than D1 and an inside edge forming a sharp edge.

5. A vortex fluid meter according to claim 4 characterized in that the flange has a longitudinal dimension (D1−D2)/2 in the range 2% to 5% of the diameter D1 of the second pipe portion.

6. A vortex fluid meter according to claim 4 characterized in that, in a plane containing the axis of symmetry of the pipe, the flange has a local cross-section which is uniform and triangular, the apex of the triangle constituting the local inside edge of said flange.

7. A vortex fluid meter according to claim 1 characterized in that the inside wall of the first pipe portion has a local inside profile formed, in a plane containing the axis of symmetry of the pipe, in the upstream to downstream direction, by two successive circular arcs with their concave sides facing opposite ways, corresponding to circles of radius r and R satisfying the equation $$r = (a^2 + b^2)/2b(\mu+1)$$

where:

$$a = \sqrt{b[2(R+r) - b]}$$

$$b = (D - D1)/2$$

$$\mu = R/r.$$

8. A vortex fluid meter according to claim 6 characterized in that the inside wall of the first pipe portion has a local internal profile which is formed in a plane containing the axis of symmetry of the pipe by a portion of a sinusoidal curve.

9. A vortex fluid meter according to claim 8 characterized in that the diameter D1 of the second pipe portion has a value in the range 60% to 90% of the value of the original diameter D.

10. A vortex fluid meter according to claim 9 characterized in that the diameter D1 lies preferably in the range 70% to 80% of the original diameter D.

11. A vortex fluid meter according to claim 10 characterized in that the second pipe portion has a length in the range 1.5 times to 3 times the diameter D1.

12. A vortex fluid meter according to claim 6 characterized in that the ratio d/D1 lies in the range 0.15 to 0.30.

13. A vortex fluid meter according to claim 1 characterized in that the obstacle has an upstream face and a downstream face parallel to each other and perpendicular to the direction of fluid flow, and two symmetrical lateral faces whereby the cross-section of said obstacle is trapezium-shaped, the base of said trapezium being on the upstream side.

14. A vortex fluid meter according to claim 13 characterized in that the upstream face of the obstacle is at a distance from the first pipe portion in the range 0.5 D1 to D1.

15. A vortex fluid meter according to claim 14 characterized in that the means for detecting the signal corresponding to oscillations of the vortices and for deducing the volume of fluid therefrom are attached to the obstacle.

16. A vortex fluid meter according to claim 15 characterized in that the means for detecting the signal corresponding to oscillations of the vortices and for deducing the volume of fluid therefrom comprise two parallel main longitudinal passages symmetrically disposed in the obstacle near lateral faces of the latter together with a plurality of evenly distributed secondary passages connecting said main passages in a direction perpendicular to said lateral faces, and a sensor connected to the main passages and to an electronic circuit for deducing the volume of fluid from the said detected signal.

17. A vortex fluid meter according to any one of claim 1 characterized in that the means for detecting the signal corresponding to oscillations of the vortices and for deducing the volume of fluid therefrom comprise a plate disposed in the middle of the fluid flow downstream of the obstacle and in the second pipe portion, said plate having a longitudinal dimension D1 perpendicular to the direction of flow of the fluid and a rectangular cross-section formed by two larger lateral faces parallel to the direction of flow of the fluid and smaller upstream and downstream faces, two parallel longitudinal main passages in said plate near said upstream face, each of said main passages being connected to one only of said lateral faces by a plurality of evenly distributed perpendicular secondary passages, and a sensor connected to the main passages and to an electronic circuit for deducing the volume of fluid from the said detected signal.

18. A vortex fluid meter according to claim 17 characterized in that the upstream face of the plate has a transverse dimension in the range 0.1 times to 0.4 times the transverse dimension d of the obstacle.

19. A vortex fluid meter according to claim 17 characterized in that the upstream face of the plate is at a distance from the upstream face of the obstacle in the range 3d to 7d.

20. A vortex fluid meter according to claim 19 characterized in that the main passages have a diameter slightly less than the transverse dimension of the upstream face of the plate and in that said main passages are offset relative to each other in the direction of flow of the fluid.

21. A vortex fluid meter according to claim 17 characterized in that the sensor is a heat sensor.

22. A vortex fluid meter according to claim 17 characterized in that the sensor is a pressure sensor.

* * * * *